(12) United States Patent
Jung

(10) Patent No.: US 10,064,104 B2
(45) Date of Patent: Aug. 28, 2018

(54) METHOD AND SYSTEM FOR RESERVING RESOURCES IN MOBILE COMMUNICATION SYSTEM

(75) Inventor: Kyung Hun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 14/113,463

(22) PCT Filed: Apr. 26, 2012

(86) PCT No.: PCT/KR2012/003217
§ 371 (c)(1),
(2), (4) Date: Oct. 23, 2013

(87) PCT Pub. No.: WO2012/148177
PCT Pub. Date: Nov. 1, 2012

(65) Prior Publication Data
US 2014/0050179 A1    Feb. 20, 2014

(30) Foreign Application Priority Data

Apr. 28, 2011 (KR) .................. 10-2011-0039896

(51) Int. Cl.
*H04W 28/24* (2009.01)
*H04W 76/12* (2018.01)
*H04W 28/26* (2009.01)

(52) U.S. Cl.
CPC .......... *H04W 28/24* (2013.01); *H04W 76/12* (2018.02); *H04W 28/26* (2013.01)

(58) Field of Classification Search
CPC ... H04W 28/26; H04W 76/022; H04W 28/24; H04W 92/18; H04W 76/12; H04W 76/10;
(Continued)

(56) References Cited

U.S. PATENT DOCUMENTS 6,654,610 B1   11/2003 Chen et al.
6,683,853 B1 *  1/2004 Kannas ............... H04L 12/5695
                                                       370/230
(Continued)

FOREIGN PATENT DOCUMENTS

EP    1 152 571 A2    11/2001
EP    1 998 517 A1    12/2008
(Continued)

OTHER PUBLICATIONS

Ye, "Method for Providing Data Service in General Packet Radio Service", Aug. 23, 2006, KR, KR10-2006-0092474 machine translation.*

(Continued)

*Primary Examiner* — Paul H Masur
*Assistant Examiner* — Michael K Phillips
(74) *Attorney, Agent, or Firm* — Jefferson IP Law, LLP

(57) ABSTRACT

The present invention relates to a resource reservation method and system for reserving resources in a mobile multimedia system, and the method of the present invention comprises: a resource request step in which a terminal, which has negotiated communication conditions with another terminal, transmits a PDP context activation request message for reserving resources according to the communication conditions to a serving GPRS support node (SGSN); and a response step in which the SGSN transmits a response message including information on a determined QoS level to the terminal.

13 Claims, 12 Drawing Sheets

(58) Field of Classification Search
CPC ..... H04W 88/16; H04W 92/10; H04W 28/18; H04W 80/04; H04W 28/16; H04W 72/0406; H04W 76/18; H04L 65/80; H04L 65/1069; H04L 65/1016; H04L 47/14; H04L 47/70; H04L 47/805; H04L 67/322

See application file for complete search history.

(56) References Cited

U.S. PATENT DOCUMENTS

| | | | | |
|---|---|---|---|---|
| 8,295,269 | B1* | 10/2012 | Hurtta | H04W 76/022 370/348 |
| 2002/0128017 | A1* | 9/2002 | Virtanen | 455/452 |
| 2002/0147824 | A1* | 10/2002 | Hurtta | H04L 67/04 709/230 |
| 2002/0165966 | A1* | 11/2002 | Widegren | H04L 12/14 709/226 |
| 2004/0022266 | A1* | 2/2004 | Greis | H04W 28/18 370/467 |
| 2004/0218607 | A1* | 11/2004 | Hurtta et al. | 370/395.21 |
| 2005/0249238 | A1 | 11/2005 | Haumont | |
| 2006/0099930 | A1* | 5/2006 | Cormier | H04L 63/10 455/412.1 |
| 2007/0185809 | A1* | 8/2007 | Duan | G06Q 20/10 705/39 |
| 2007/0201430 | A1 | 8/2007 | Holmstrom et al. | |
| 2008/0013470 | A1* | 1/2008 | Kopplin | 370/310 |
| 2009/0116478 | A1* | 5/2009 | Hurtta et al. | 370/389 |
| 2009/0147670 | A1* | 6/2009 | Hu | 370/216 |
| 2009/0196230 | A1* | 8/2009 | Kim et al. | 370/328 |
| 2009/0213749 | A1* | 8/2009 | Han | 370/252 |
| 2010/0061386 | A1* | 3/2010 | Olsson | H04W 76/11 370/401 |
| 2011/0158174 | A1* | 6/2011 | Hurtta | H04W 76/022 370/328 |
| 2012/0170453 | A1* | 7/2012 | Tiwari | H04W 76/027 370/230 |
| 2014/0192751 | A1* | 7/2014 | Oksala | H04W 28/24 370/329 |

FOREIGN PATENT DOCUMENTS

| | | |
|---|---|---|
| KR | 10-2005-0019858 A | 3/2005 |
| KR | 10-2006-0092474 A | 8/2006 |
| WO | 2007/039432 A1 | 4/2007 |

OTHER PUBLICATIONS

Nokia, "Communication Channel Selection", Mar. 3, 2005, KR, KR10-2005-0019858 machine translation.*
TSG-RAN WG3 meeting #7 TDoc S2-99657 (3GPP) Sep. 20-24, 1999, 9.2.3.3 MS-Initiated PDP Context Modification Procedure.
3GPP TSG-CN-WG1, Meeting #17; "Reject Cause Code Mapping Between 24.008 and 29.060"; 3rd Generation Partnership Project (3GPP), Mobile Competence Centre; Ericsson; N1-010651; Apr. 30, 2001; pp. 1-5; Helsinki, Finland.

* cited by examiner

FIG. 3

| 8 | 7 | 6 | 5 | 4 | 3 | 2 | 1 | |
|---|---|---|---|---|---|---|---|---|
| Quality of service IE | | | | | | | | octet 1 |
| Length of quality of service IE | | | | | | | | octet 2 |
| 0 0 spare | | Delay class | | | Reliability class | | | octet 3 |
| Peak throughput | | | | 0 spare | Precedence class | | | octet 4 |
| 0 0 spare | | | Mean throughput | | | | | octet 5 |
| Traffic Class | | | Delivery order | | Delivery of erroneous SDU | | | octet 6 |
| Maximum SDU size | | | | | | | | octet 7 |
| Maximum bit rate for uplink | | | | | | | | octet 8 |
| Maximum bit rate for downlink | | | | | | | | octet 9 |
| Residual BER | | | | SDU error ratio | | | | octet 10 |
| Transfer delay | | | | | | Traffic Handling priority | | octet 11 |
| Guaranteed bit rate for uplink | | | | | | | | octet 12 |
| Guaranteed bit rate for downlink | | | | | | | | octet 13 |
| 0 0 spare | | | Signal-ling indicat-ion | Source Statistics Descriptor | | | | octet 14 |
| Maximum bit rate for downlink (extended) | | | | | | | | octet 15 |
| Guaranteed bit rate for downlink (extended) | | | | | | | | octet 16 |
| Maximum bit rate for uplink (extended) | | | | | | | | octet 17 |
| Guaranteed bit rate for uplink (extended) | | | | | | | | octet 18 |

FIG. 9

| 1st SDP offer |
|---|
| m=audio 49152 RTP / AVP 97 98 99 100 |
| a=tcap : 1 RTP / AVFF |
| a=pcfg : 1 t=1 |
| a=rtpmap : 97  AMR-WB / 16000 / 1 |
| a=fmtp : 97 mode-change-capability=2 ; max-red=220 |
| a=rtpmap : 99  AMR / 8000 / 1 |
| a=fmtp : 99 mode-change-capability=2 ; max-red=220 |
| 1st SDP answer |
| m=audio 49152 RTP / AVPF 97 |
| a=acfg : 1 t=1 |
| a=rtpmap : 97  AMR-WB / 16000 / 1 |
| a=fmtp : 97 mode-change-period=2 ; max-red=0 |

FIG. 11

| SDP offer |
|---|
| m=audio 49152 RTP / AVP 97 98 99 100 |
| a=tcap : 1 RTP / AVFF |
| a=pcfg : 1 t=1 |
| a=rtpmap : 97 AMR-WB / 16000 / 1 |
| a=fmtp : 97 mode-change-capability=2 ; max-red=220 |
| a=rtpmap : 99 AMR / 8000 / 1 |
| a=fmtp : 99 mode-change-capability=2 ; max-red=220 |
| SDP answer |
| m=audio 49152 RTP / AVPF 97 |
| a=acfg : 1 t=1 |
| a=rtpmap : 97 AMR-WB / 16000 / 1 |
| a=fmtp : 97 mode-set=0, 1, 2, mode-change-period=2, mode-change-neighbor=1; \ mode-change-capability=2, max-red=0 |

FIG. 12

| SDP offer |
|---|
| m=audio 49152 RTP / AVP 97 |
| a=tcap : 1 RTP / AVFF |
| a=pcfg : 1 t=1 |
| a=rtpmap : 97  AMR-WB / 16000 / 1 |
| a=fmtp : 97  mode-select=0, 1, 2 ; mode-change-period=2, \ |
|   mode-change-neighbor=1 ; mode-change-capability=2 ; max-red=0 |
| a=ptime:20 |
| a=maxptime:20 |
| SDP answer |
| m=audio 49152 RTP / AVPF 97 |
| a=acfg : 1 t=1 |
| a=rtpmap : 97  AVS / 16000 /1 |
| a=fmtp : 97  mode-select=0, 1 ; mode-change-period=2, \ |
|   mode-change-neighbor=1 ; mode-change-capability=2 ; max-red=0 |
| a=ptime:20 |
| a=maxptime:240 |

METHOD AND SYSTEM FOR RESERVING RESOURCES IN MOBILE COMMUNICATION SYSTEM

PRIORITY

This is a National Stage application under 35 U.S.C. § 371 of an International application filed on Apr. 26, 2012 and assigned application No. PCT/KR2012/003217, which claims the benefit under 35 U.S.C. § 119(a) of a Korean patent application filed on Apr. 28, 2011 in the Korean Intellectual Property Office and assigned Serial No. 10-2011-0039896, the entire disclosure of which is hereby incorporated by reference.

TECHNICAL FIELD

The present disclosure relates to a resource reservation method and system for used in a mobile communication system. In particular, the present disclosure relates to a resource reservation method and system for notifying the terminal of the resource amount available currently in the network which cannot reserve the resource as much as requested by the terminal.

BACKGROUND ART

Mobile communication systems developed to provide the subscribers with voice communication services on the move. With the rapid advance of technologies, the mobile communication systems have evolved to support high speed data communication services as well as the standard voice communication services. However, the limited resource and user requirements for higher speed services in the current mobile communication system spur the evolution to more advanced mobile communication systems.

Meanwhile, Internet Protocol Multimedia Subsystem (IMS) is an architectural framework for delivering multimedia services on the IP-based network unlike the circuit-switched centric network system dedicated to the basic voice telephony service. Recently, IMS is becoming the key technology in the next generation communication systems because it improves the wired and wireless network services flexibility and thus contributes to the network convergence, resulting in reduction of application development and management costs and increase of service diversity with novel applications such as VoIP, Instant messenger, and Push To Talk (PTT).

In the IMS-based mobile multimedia communication system, the terminals negotiate communication conditions and reserve radio resource of the network based on the negotiated conditions.

In the conventional system, however, if it is difficult to allocate the resource to the terminal as much as fulfilling the negotiated conditions, the network rejects the resource reservation request of the terminal without notification of the reason for the reject.

Accordingly, when rejecting the radio resource request, there is a need of providing the terminal with any information to help the terminal take any subsequent action.

DISCLOSURE OF INVENTION

Technical Problem

The present disclosure provides a resource reservation method and system capable of notifying the terminal of the resource amount available currently for the network to reserve when it is difficult to reserve the resource as much as requested by the terminal

Solution to Problem

In accordance with an aspect of the present disclosure, a resource reservation method for a mobile communication system includes sending, at a terminal negotiated communication condition with a counterpart terminal, a Serving GPRS Support Node (SGSN) an Activate PDP Context Request message for reserving resources according to the communication condition, sending, at the SGSN, the terminal a response message including information on a QoS level determined by the SGSN.

In accordance with another aspect of the present disclosure, a resource reservation system for reserving resource in a mobile multimedia system includes a terminal which sends an Activate PDP Context Request message for reserving resources according to the communication condition and receives a response message in reply and a Serving GPRS Support Node (SGSN) which receives the Activate PDP Context Request message transmitted by the terminal and generates and sends the response message including information on a QoS level to the terminal.

Advantageous Effects of Invention

The resource reservation method and system of the present disclosure is capable of notifying, when it is difficult to reserve the resource as much as requested by the terminal, the terminal of the resource amount which the network is capable of reserving for the terminal currently. Accordingly, the resource request is rejected, the terminal is capable of determining whether to perform resource request again based on the currently available resource information transmitted by the network or abandon resource reservation efficiently.

BRIEF DESCRIPTION OF DRAWINGS

FIG. 3 is a diagram illustrating an exemplary QoS Information Element defining various quality properties of the multimedia service that are required in resource reservation.

FIG. 9 is a diagram illustrating the content of SDP Offer transmitted from the first terminal attempting initiation of voice communication to the second terminal as the counterpart.

FIG. 11 is a diagram illustrating exemplary SDP offer and SDP answer including an SDP attribute called mode-set which are transmitted to a counterpart terminal.

FIG. 12 is a diagram illustrating exemplary SDP offer including "mode-select" of the present disclosure.

MODE FOR THE INVENTION

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

In the following, descriptions are made of the first and second embodiments. In this case, the first embodiment is directed to a method for the network to notify the terminal of the resource amount available for the terminal currently in the network when it is difficult to reserve the resource as much as requested by the terminal The second embodiment is directed to a method for determining a bit rate of a vocoder by reflecting the negotiation result between the terminals.

The first and second embodiments are common in performing session negotiation efficiently in the IMS-based mobile multimedia communication system. Here, performing negotiation efficiently means communicating with the Quality of Service (QoS) closest to that the network is capable of allocating, the least negotiation, and highest performance codec.

<First Embodiment>

The first embodiment is directed to the method for notifying, when the network cannot reserve the resource as much as requested by the terminal, the terminal of the currently available resource amount.

Figure 1:
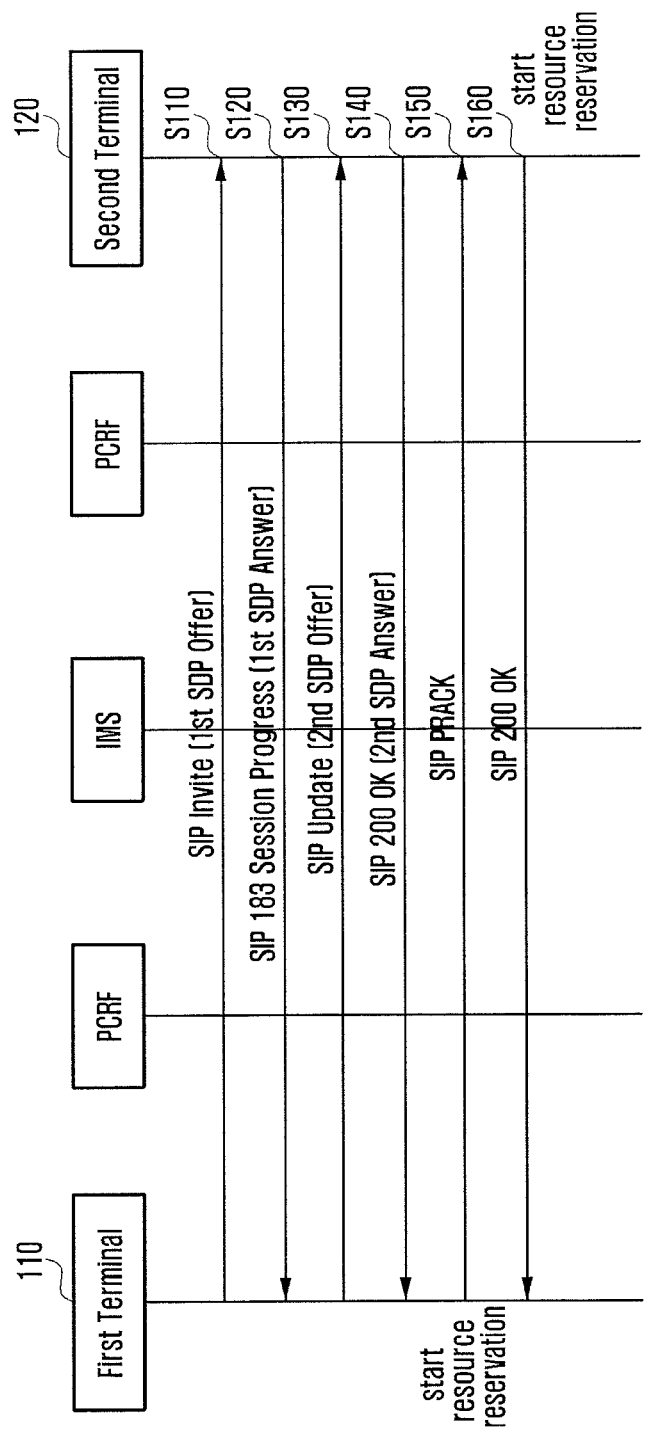
FIG. 1 is a signal flow diagram illustrating a procedure of negotiating communication conditions between two terminals preparing communication in the IMS-based mobile multimedia communication system.

FIG. 1 is a signal flow diagram illustrating a procedure of negotiating communication conditions between two terminals preparing communication in the IMS-based mobile multimedia communication system.

In the IMS-based mobile multimedia communication system, the terminals 110 and 120 preparing communication negotiate communication conditions through the procedure depicted in FIG. 1

The first terminal 110 initiating the communication sends the second terminal 120 a Session Initiation Protocol (SIP) invite message including Session Description Protocol (SDP) offer describing media communication conditions through the IMS network at operation S 110. Then the IMS nodes including Policy and Charging Rules Function (PCRF) check whether the content of the SDP request fulfills the service policy and, if necessary, deletes and/or modify the content partially. If the SIP invite message is received, the second terminal 120 analyzes the QoS information such as media codec included in the content of the SDP request carried in the message to determine whether it is possible to accept the QoS.

The second terminal sends the first terminal 110 a SIP 183 Session Progress message including an SDP answer from which unnecessary part is removed while remaining the parts acceptable among the communication conditions included in the SDP request at operation S120. The SIP 183 Session Progress message passes various IMS nodes to arrive the first terminal 110.

The first terminal 110 analyzes the content of the SDP answer and, if the communication conditions proposed by the second terminal 120 are acceptable, sends the second terminal 120 an SIP PRACK message at operation S150 to initiate QoS reservation procedure. Otherwise if the communication conditions proposed by the second terminal 120 are not acceptable, the first terminal 110 sends the second terminal 120 an SIP Update message including new SDP request at operation S 130.

Afterward, the first and second terminals 110 and 120 renegotiate the conditions acceptable with each other. It the renegotiation is successful, the first and second terminals 110 and 120 negotiate the wired/wireless resource for use in communication through resource reservation procedure with their respective networks.

Figure 2:
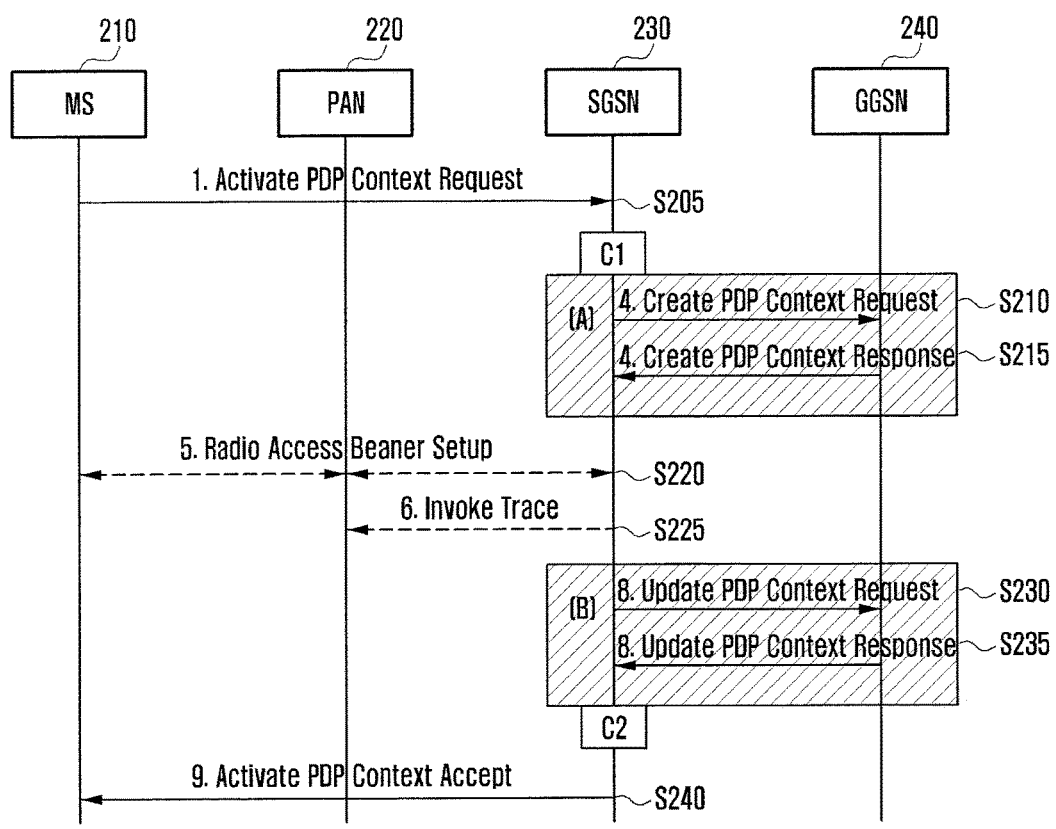
FIG. 2 is a signal flow diagram illustrating a procedure of reserving resources between the terminal and the network after negotiation of the communication conditions.

FIG. 2 is a signal flow diagram illustrating a procedure of reserving resources between the terminal and the network after negotiation of the communication conditions. FIG. 3 is a diagram illustrating an exemplary QoS Information Element defining various quality properties of the multimedia service that are required in resource reservation.

As shown in FIG. 2, the terminal 210 attempting to reserve resources with a packet network such as 3GPP HSPA generates, in lu mode, QoS Information Element of FIG. 3 using the media-related parameters included in the SDP answer received from the counterpart terminal. Then the terminal 210 sends the Serving GPRS Support Node (SGSN) 230 an Activate Secondary PDP Context message including the QoS Information Element at operation S205. For reference, the first PDP Context is activated for transmitting SIP or SDP message at the initial phase of communication, and the second PDP Context is activated to transmit voice or video.

The SGSN 230 generates a Create PDP Context Request message based on the Activate Secondary PDP Context message received from the terminal 210 and sends this message to the Gateway GPRS Support Node (GGSN) 240 at operation S210. In this case, the SGSN 230 may restrict the QoS level requesting the GGSN depending on its processing capability or current load state. If the QoS requested by the terminal is not acceptable, the SGSN 230 sends the terminal 210 the Activate Secondary PDP Context Reject message to reject the resource reservation request (not shown in drawing).

The GGSN 240 may restrict the QoS level negotiated according to the processing capability and current load state for the Create PDP Context Request message. The GGSN 240 sends the SGSN 230 a Create PDP Context Response message including the negotiated QoS level at operation S215.

Then the terminal 210 and the network configure a Radio Access Bearer as the transmission path between the terminal and the base station based on the negotiated QoS through S220 to S235.

The SGSN 230 sends the terminal 210 the Activate Secondary PDP Context Accept message at operation S240, and the terminal transmits/receives compressed multimedia.

If the QoS level accepted by the GGSN 240 is low excessively, the SGSN 230 sends the terminal 210 an Activate Secondary PDP Context Reject message.

Figure 4:
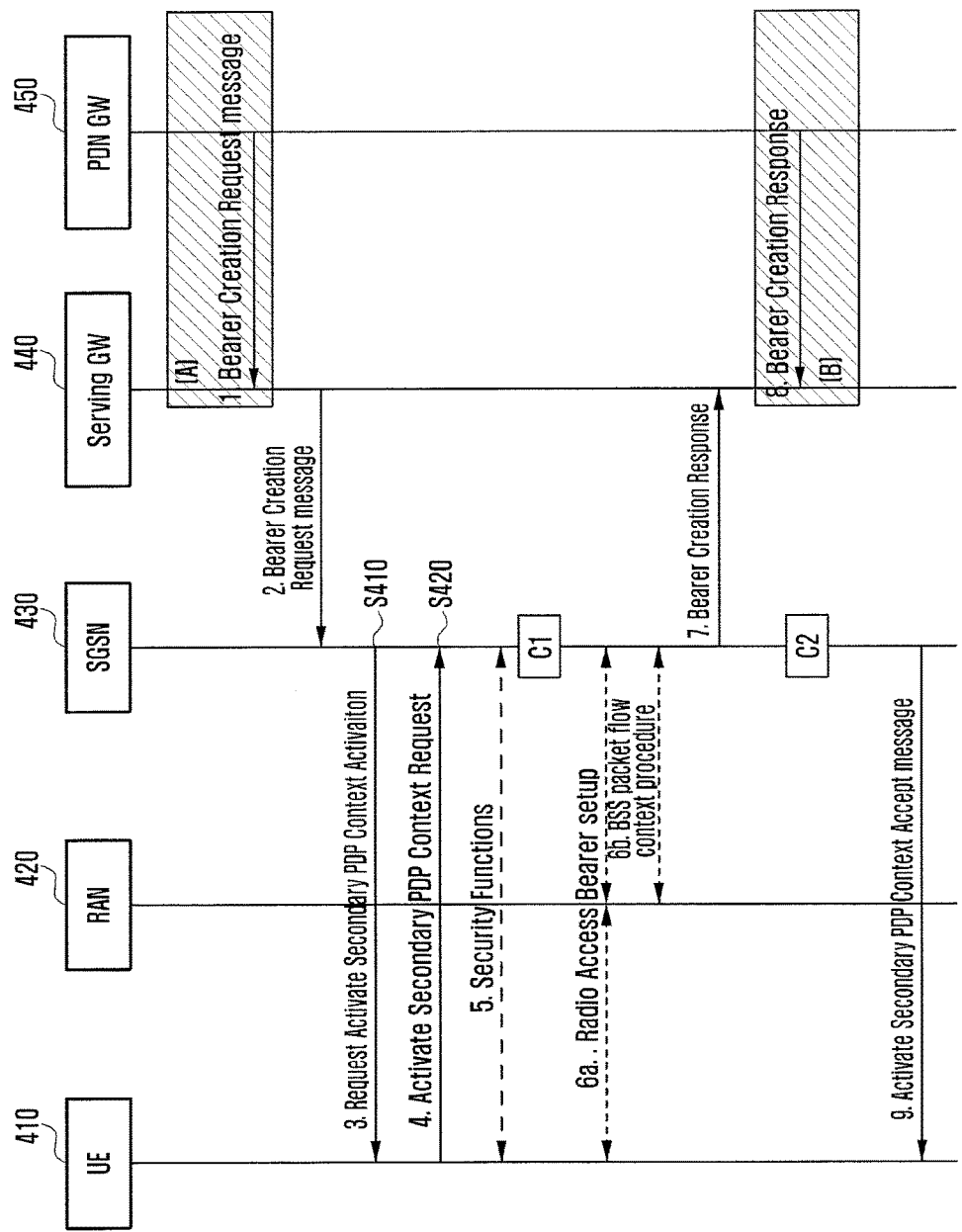
FIG. 4 is a diagram illustrating IMS network of the 3GPP Long Term Evolution (LTE) different in structure.

Even in a differently structured IMS network such as 3GPP Long Term Evolution (LTE) as shown in FIG. 4, the terminal 410 sends the Activate Secondary PDP Context Request to the SGSN 430 at operation S410 and receives the PDP Context Reject message or Activate Secondary PDP Context Accept message from the SGSN 430.

In the descriptions with reference to FIGS. 1 to 3, when the terminals have exchanged SDP request and SDP answer and initiated QoS reservation with the IMS network according to the negotiation result, the result may be classified into one of three cases.

First, the network accepts the requested QoS level. At this time, the terminal 210 finds the value matching its request in the negotiated QoS level of the Activate Secondary PDP Context Accept message received from the SGSN 230. In this case, the terminal may start communication immediately.

Second, the QoS level lower than the request QoS level is allocated. If the determined QoS level is lower than the level requested by the terminal 210, the terminal 210 may start communication at low QoS level or abandon communication.

Third, the IMS network nodes such as SSGN 230 and GGSN 240 have the radio resource insufficient to allocate as much as requested by the nodes and thus reject the request. At this time, the Activate Secondary PDP Context Reject message received from the SGNS 230 includes an error code indicating no resource allocation to the terminal 210 due to the lack of radio resource (e.g. #26: insufficient resources, 3GPP TS 24.008) but not any information on the shortage amount which has caused the rejection.

Accordingly, the terminal 210 has no way of aware of whether the QoS level negotiated with the counterpart terminal is lower than the currently available level of the IMS network significantly or, if decreased to some extent, acceptable with renegotiation. In this case, if the terminal 210 continues attempting communication so long time or re-requests with a tiny decreased level, it is likely to abandon the communication even through the resource is allocated for communication. This problem is caused because when the terminal's resource allocation request is rejected no information helpful for the terminal to determine a subsequent action is sent back.

The first embodiment of the present disclosure proposes a method capable of improving the signaling to the terminal when the network cannot allocate the QoS level requested by the terminal due to the resource shortage in the QoS negotiation process between the terminal and the IMS network in the IMS-based mobile multimedia communication system. Accordingly, the terminal is aware of the current situation of the network and performs a subsequent operation efficiently.

A description is made of the structure of the present disclosure to accomplish the above goal hereinafter.

The SGSN analyzes the Activate PDP Context Request message received from the terminal to verify that there is no syntactic or grammatical error. The SGSN determines whether the QoS Request included in the message fulfills the service contract and is in the range capable of being allocated by the network. According to whether the requested QoS level is capable of being allocated, the SGNS performs one of the three operations as follows.

If it is possible to allocate, the SGSN requests the GGSN for the QoS of the same level by transmitting Create PDP Context Request message.

If it is impossible to allocate, the SGSN decreases the QoS level to the extent predicted acceptable and requests the GGSN for the QoS by transmitting the Create PDP Context Request message.

If the SGSN determines that it is difficult to allocate the least QoS level, e.g. difficult to allocate resource for voice communication, it sends the terminal the Activate Secondary PDP Context Reject message including an error code (insufficient resource) and the determined QoS level (QoS Negotiated) set to 0 without additional negotiation with the GGSN. If the determined QoS level is set to 0, this means that the resource amount which the network is capable of allocating to the terminal is 0.

The third method is different from the conventional method in that the "QoS Negotiated=0" message is transmitted to the terminal, and this value is not transmitted from the SGSN to the GGSN and notifies the terminal that the current communication attempt is not acceptable for the time being.

In the case that the requested QoS level cannot be accepted due to the network management policy after the resource negotiation between SGSN and GGSN, the SGSN has to send the terminal the Activate Secondary PDP Context Reject message. According to an embodiment of the present disclosure, the SGSN sends the terminal the QoS Negotiated value included in the Create PDP Context Response message transmitted by the GGSN along with the error code. That is, according to an embodiment of the present disclosure, the Activate Secondary PDP Context Reject message transmitted from the SGSN to the terminal due to the radio resource shortage includes the level of the resource allocable currently as well as the reason code, and the terminal may attempt renegotiation with reduced level or put off the communication for the time being based on the received information.

Figure 5:
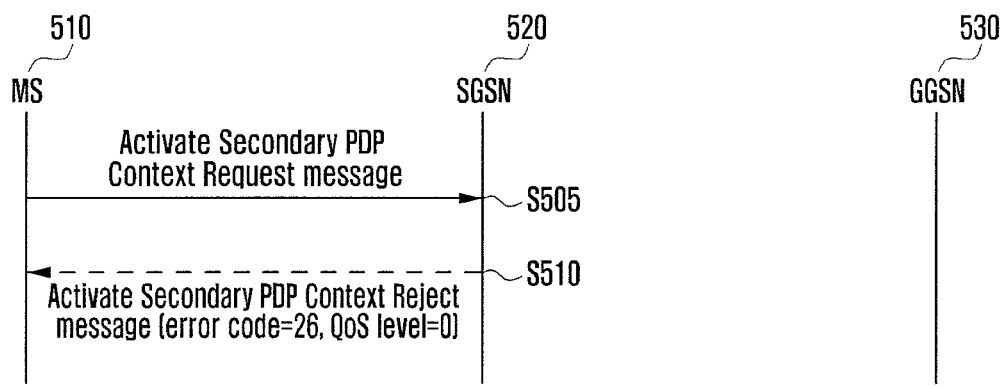
FIG. 5 is a signal flow diagram illustrating a procedure for the SGSN 520 to reject the request of the terminal according to an embodiment of the present disclosure.

FIG. 5 is a signal flow diagram illustrating a procedure for the SGSN 520 to reject the request of the terminal according to an embodiment of the present disclosure.

The terminal 510 sends the SGSN 520 the Activate Secondary PDP Context Request message at operation S505. Then the SGSN 520 checks the QoS Request of the received message to determine whether to fulfill the requested level in the current situation. If it is difficult to fulfill and thus there is no need of additional negotiation with the GGSN, the SGNS 520 sends the terminal the Activate Secondary PDP Context Reject message at operation S510. The Activate Secondary PDP Context Reject message includes the determined QoS level se to 0 (i.e. "QoS Negotiated=0") along with the error code (insufficient resource). In the conventional method, only the error code is transmitted. If the determined QoS level is set to 0, this means that the resource amount which the network is capable of allocating to the terminal is 0.

Figure 6:
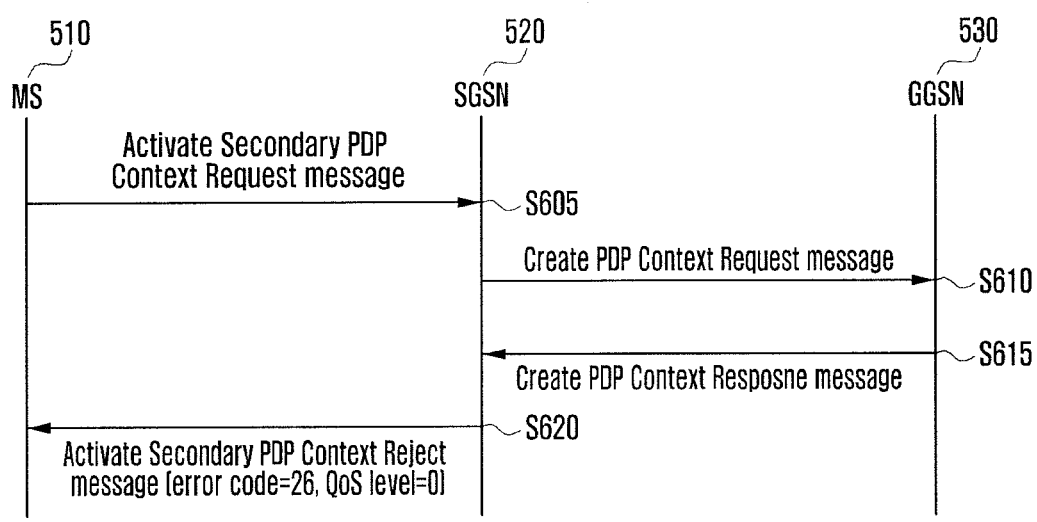
FIG. 6 is a signal flow diagram illustrating a procedure for the SGSN 520 to reject the resource request of the terminal according to another embodiment of the present disclosure.

FIG. 6 is a signal flow diagram illustrating a procedure for the SGSN 520 to reject the resource request of the terminal according to another embodiment of the present disclosure.

The terminal 510 first sends the SGSN 520 the Activate Secondary PDP Context Request message at operation S605. Then, if it is determined that the request QoS is acceptable at the current level or after decreasing the requested level, the SGSN 520 sends the GGSN 630 the Create PDP Context Request message based on the QoS value requested by the terminal or the decreased QoS value at operation S610.

Then the GGSN 530 sends the SGSN 520 the Create PDP Context Response message including the QoS Negotiated value including the supportable QoS level.

If the service requested by the terminal is rejected according to the determined QoS level (QoS Negotiated) value transmitted by the GGSN 530, the SGSN 520 sends the terminal 510 the Activate Secondary PDP Context Reject message. The Activate Secondary PDP Context Reject message includes the error code (insufficient resource) and determined QoS level (QoS Negotiated) value. That is, the SGSN 530 may allow the service corresponding to the determined QoS level (QoS Negotiated) value received from the GGSN or not, the determined QoS level (QoS Negotiated) value is transmitted to the terminal 510 in any case.

The principle of transmitting, at the SGSN 520, the determined QoS level (Negotiated QoS) value to the terminal 510 in any case may be applied to the network structure of FIG. 4 in which the Serving Gateway (GW) negotiates with the PDN GW in the same way.

Figure 7:
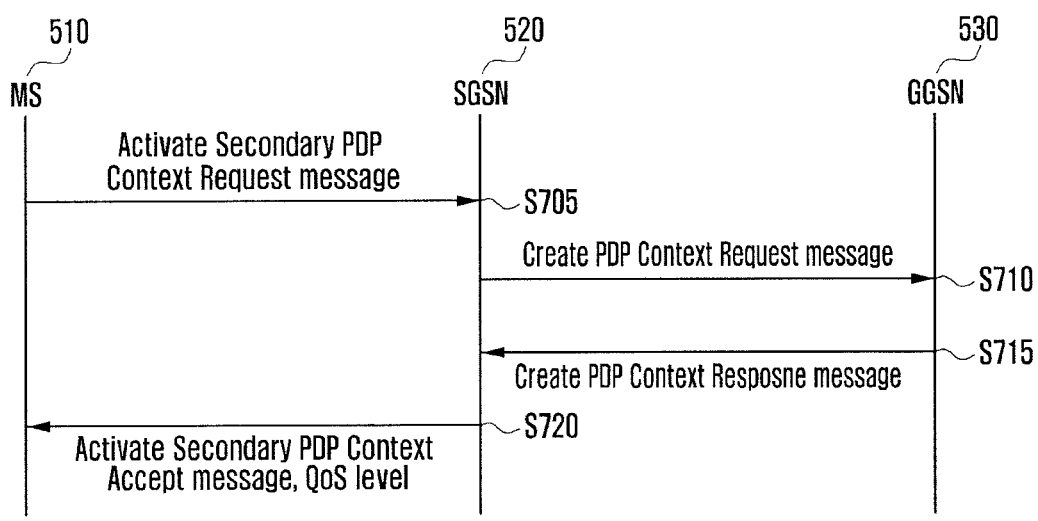
FIG. 7 is a signal flow diagram illustrating a procedure for the SGSN 520 to accept the resource request of the terminal according to an embodiment of the present disclosure.

FIG. 7 is a signal flow diagram illustrating a procedure for the SGSN 520 to accept the resource request of the terminal according to an embodiment of the present disclosure.

The terminal 510 first sends the SGSN 520 the Activate Secondary PDP Context Request message at operation S705. If the request QoS is acceptable, the SGSN 520 sends the GGSN 530 the Create PDP Context Request message at operation S710. The GGSN 530 sends the SGSN 520 the Create PDP Context Response message including the determined QoS level (QoS Negotiated) value indicating the supportable QoS level at operation S715.

If the GGSN 530 accepts the service requested by the terminal according to the determined QoS level (QoS Negotiated) value, the SGSN 520 sends the terminal 510 the Activate Secondary PDP Context Accept message at operation S720. This message includes the determined QoS level (QoS negotiated) value.

Figure 8:
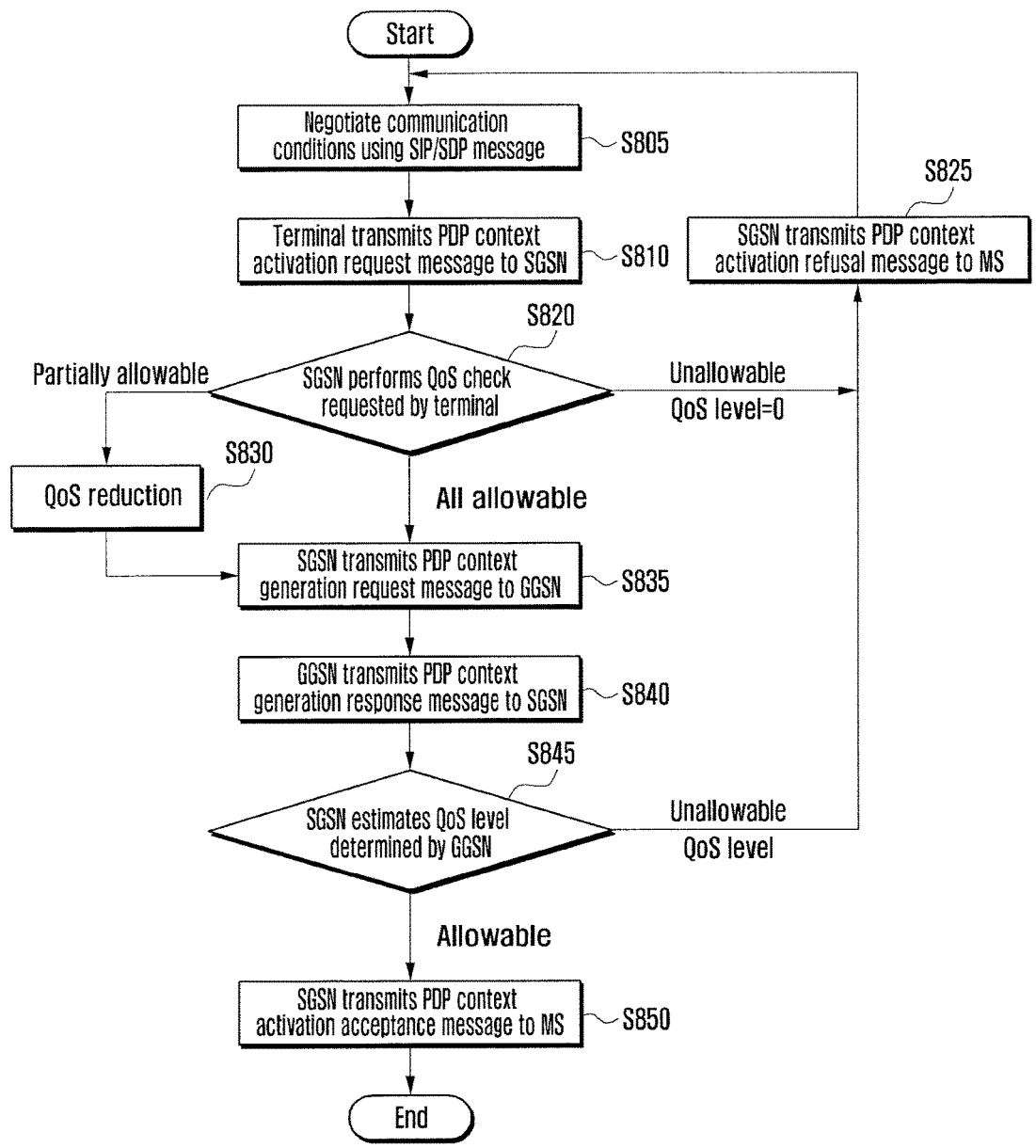
FIG. 8 is a flowchart illustrating the resource negotiation procedure among the terminal, SGSN, and GGSN according to an embodiment of the present disclosure.

FIG. 8 is a flowchart illustrating the resource negotiation procedure among the terminal, SGSN, and GGSN according to an embodiment of the present disclosure.

First, the two terminals preparing communication with each other exchange SIP or SSDP messages to negotiate communication condition at operation S805. Once the communication condition negotiation has completed, the each terminal initiates the resource reservation procedure of its serving network.

For this purpose, one terminal generates the QoS information element as depicted in FIG. 3 using the media-related parameters included in the SDP answer received from the other terminal The terminal sends the SGSN the Activate Secondary PDP Context Request message including the QoS information element at operation S810.

Then the SGSN check the QoS request of the terminal to determine whether the request is acceptable in the current situation at operation S820. If it is acceptable, the SGSN sends the terminal the Activate Secondary PDP Context Reject message at operation S825. The Activate Secondary PDP Context Reject message includes the determined QoS level set to 0 (i.e. "QoS Negotiated=0") along with the error code (insufficient resource).

If the radio resource (QoS) requested by the terminal is supportable entirely, the SGSN sends the GGSN the Create PDP Context Request message at operation S835. Otherwise if the radio resource (QoS) requested by the terminal is allowable partially, the SGSN decreases the QoS at operation S830 and then performs operation 835.

After operation S835, the GGSN sends the SGSN the Create PDP Context Response message reflecting the QoS negation result between the GGSN and the SGSN. Then the SGSN determines whether to reject the service requested by the terminal based on the determined QoS level (QoS Negotiated) value at operation S845.

If it is determined to reject, the SGSN sends the terminal the Activate Secondary PDP Context Reject message at operation S825. The Activate Secondary PDP Context Reject message includes the determined QoS level (QoS Negotiated) along with the error code (insufficient resource).

Otherwise if it is determined to accept, the SGSN sends the terminal the Activate PDP Context Accept message for allowing the radio resource requested by the terminal at operation S850.

According to the first embodiment of the present disclosure, the terminal is aware of the QoS level acceptable by the network even when the service requested by the terminal is not accepted and, if this value is 0 or very small, may put off the communication attempt. Although the service requested by the terminal is rejected, it is possible to retry communication with the QoS decreased to any acceptable level.

In the conventional technology, when the requested service is rejected, the terminal has no way of being aware of whether the requested QoS level is too high to accept or, if decreased to some extent, acceptable so as to be likely to abandon to retry negotiation with the network even when the communication can be initiate with the repeated service request or reduced QoS level.

According to the first embodiment of the present disclosure, it is possible to perform the QoS negotiation between the network and the terminal at the level close to the level supportable by the network as far as possible and acquire negotiation result as soon as possible.

<Second Embodiment>

The second embodiment is directed to the method for determining the bit rate of the vocoder by reflecting the recommendations of the terminals.

FIG. 9 is a diagram illustrating the content of SDP Offer transmitted from the first terminal attempting initiation of voice communication to the second terminal as the counterpart.

The first terminal attempting initiation of voice communication generates the SDP offer formatted as shown in FIG. 9. In the exemplary formation of FIG. 9, the SDP includes an AMR-WB codec providing high communication quality and requiring high bit rate (0bit-rate) and an AMR codec providing low communication quality and requiring low bit rate. The AMR-WB codec supports 9 bit-rates of 6.6~23.85 kbps, and the AMR supports 8 bit-rates of 4.75~12.2 kbps.

Figure 10:
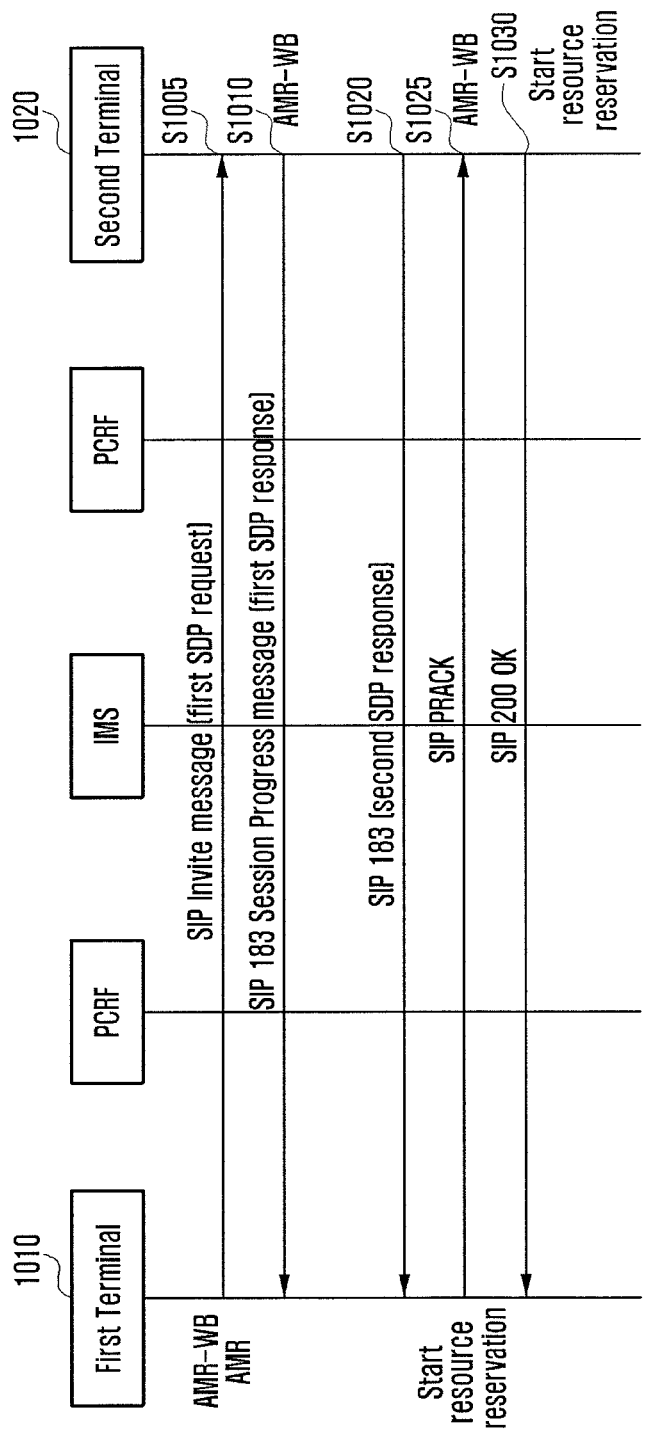
FIG. 10 is a signal flow diagram illustrating the procedure of negotiating the codec to be used between the first and second terminals 1010 and 1020.

The first terminal sends the second terminal the generated SDP offer through the procedure depicted in FIG. 10.

FIG. 10 is a signal flow diagram illustrating the procedure of negotiating the codec to be used between the first and second terminals 1010 and 1020. Here, FIG. 10 is depicted under the assumption that the first terminal 1010 sends the second terminal 1020 the SDP offer generated as shown in FIG. 9.

The first terminal 1010 sends the second terminal 1020 a SIP invite message including the SDP offer at operation S1005. In this case, if the AMR-WB codec and the maximum bit rate of 23.85 kbps are accepted by both the first and second terminals 1010 and 1020, the IMS node forwards the SDP offer to the terminal 1020 without any modification.

Then the second terminal 1020 generates an SDP answer including the AMR-WB of the SDP offer with the exception AMR part. The second terminal 1020 sends the first terminal 1010 an SIP 183 Session Progress Message including the SDP answer at operation S 1010.

The second terminal 1020 sends the first terminal 1010 an acknowledgement message (SIP 183 message) including the SDP answer at operation S1020 and exchanges PRACK and response message at operations S1025 and S1030 to complete negotiation.

Then each terminal initiates the QoS reservation procedure with the IMS network to which it has connected to negotiate the resource for use in the communication.

After completing negotiation between the first and second terminals 1010 and 1020 to use AMR-WB as shown in FIGS. 9 and 10, if the QoS request with the value obtained by summing the highest bit rate of 23.85 kbps of the AMR-WB and the IP overhead to the IMS network is rejected, the terminal may take one of the following actions.

First, the terminal may abandon the communication attempt.

Second, the terminal may attempt negotiation by exchanging SDP offer and SDP answer and, if negotiation has completed, request the IMS network for radio resource allocation based on the negotiation result. The method for initiating negotiation with the restriction of the bit rate of AMR-WB to 6.6, 8.85, and 12.65 kbps is characterized in that the SDP offer or SDP answer includes an SDP attribute referred to as mode-set, however, the mode-set attribute is not recommended for use by terminals. According to RFC 4867, the mode-set allows only two types of responses, i.e. acceptance and rejection, and it is not allowed to accept some of the bit rates restricted through the mode-set partially or send additional ones.

The third method that can be used by the terminal attempting communication is to start renegotiation by transmitting the SDP offer including AMR of lower quality level than the maximum bit rate of AMR-WB. If it is possible to allocate the voice bit rate of 13 kbps currently, the AMR-WB is selected; and if 12.65 kbps is allocated, it is possible to maintain the highest level of audio quality currently but communication starts at AMR 12.2 kbps due to the restriction of conventional technology and thus it is impossible to accomplish the highest level of voice quality with the codec supported by both the terminals at the bit rate supported by both the terminals.

If the QoS requested by the terminal is not supported in the network, the terminal may abandon or postpone the voice communication attempt with the exception of retry in an emergency situation. In this case, the network recommends the target QoS decreases a little as compared to the previously recommended level and, the second embodiment of the present disclosure proposes a method capable of overcoming the problem of the RFC 4867 "mode-set" defined for AMR and AMR-WB and completing the negotiation with least message exchange even when several operations are modified in transmitting the SDP offer and SDP answer. That is, the second embodiment of the present disclosure is directed to the vocoder supporting a plurality of bit rates, mode selection attribute ("mode-select") as an SDP attribute indicating voice bit rate to be used in the communication, and the usage method thereof.

Supposes a virtual vocoder called AVS supports the bit rates of 8, 12, 16, 20, and 24 kbps. When the first and second terminals 1010 and 1020 negotiate by exchanging the SDP offer and SDP answer, the terminals and IMS nodes have permitted the use of all of the bit rates in voice communication but the IMS network has rejected the QoS level requested with the sum of 24 kbps as the maximum value of AVS and IP overhead at the PDP Context Activation process.

At this time, the first terminal 1010 has determined to renegotiate using a decreased level other than waiting until the radio resource becomes available and generates the SDP offer as shown in FIG. 12 using the mode-selection proposed in the present disclosure. The SDP offer indicates 16 kbps as the maximum bit rate of the vocoder explicitly. The first terminal 1010 sends the SDP offer to the second terminal 1020 as the counterpart terminal.

In more detail, the first terminal 1010 adds a command of "mode-select=0, 1, 2" to the RTP payload type description of the AVS vocoder in the SDP offer.

Correspondingly, the second terminal 1020 determines that 16 kbps is excessive from the previous resource reservation (QoS reservation) experience and decreases the maximum bit-rate to 12 kbps ("mode-select=0, 1").

That is, the bit rate indicated by the mode-select may be re-proposed to the counterpart terminal in the SDP answer by selecting some of the bit-rates. Each terminal may reject the vocoder's bit rate proposed through the mode-select or select all or some of the proposed bit rates. FIG. 12 is directed to an exemplary case of selecting some of the proposed bit rates.

Meanwhile, each bit rate of the AVS vocoder is expressed an integer in the range of 0~4. In an embodiment of the present disclosure, the mode-select=0, 1, 2 command in the SDP order is transmitted to the counterpart terminal via IMS nodes, and the IMS nodes may remove some of the bit rates of 0, 1, and 2 but cannot add another bit rate. That is, the number of bit rates indicated by the mode-select may be maintained or reduced while passing through several IMS nodes from the first terminal 1010 to the second terminal 1020, and the second terminal may accept this and send further reduced SDP answer to the terminal A.

Compared to the mode-set allowing for only two alternative selections of acceptance or rejection, the mode-select allows some change in the proposal and reflect the proposal to the negotiation among the terminals and nodes in the shortest duration.

To summarize, the mode-set according to the convention technology allows for only two probabilities of accepting and rejecting, at the second terminal 1020, the SDP offer of the first terminal 1010 which has been received through IMS nodes and thus the second terminal 1020 has no way of reflecting its intention.

However, the mode-select according to the second embodiment of the present disclosure is capable of determining the bit rates of the vocoder promptly by reflecting the intentions of both terminals so as to reduce the number of renegotiations as compared to the conventional technology.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A resource reservation method of a terminal, the method comprising:
   transmitting, from a terminal having negotiated communication condition with a counterpart terminal, an activate packet data protocol (PDP) context request message for reserving first resources according to the communication condition to a serving GPRS support node (SGSN);
   receiving, from the SGSN, an activate PDP context reject message including information on a QoS level determined by the SGSN corresponding to the activate PDP context request message, when the first resources requested by the terminal cannot be allocated in a network;
   determining whether to request second resources based on the QoS level indicating resource amount that can be allocated to the terminal in the network; and requesting the second resources, when the terminal determines to request the second resources.

2. The method of claim 1, wherein the determined QoS level is set to 0.

3. A terminal for reserving resources in a mobile multimedia system, the terminal comprising:
   a transceiver configured to transmit and receive a signal; and
   a controller configured to control:
      transmitting, to a serving GPRS support node (SGSN), an activate packet data protocol (PDP) context request message for reserving first resources according to a communication condition of the terminal,
      receiving, from the SGSN, an activate PDP context reject message including information on a QoS level determined by the SGSN corresponding to the activate PDP context request message, when the first resources requested by the terminal cannot be allocated in a network,
      determining whether to request second resources based on the QoS level indicating resource amount that can be allocated to the terminal in the network, and
      requesting the second resources, when the terminal determines to request the second resources.

4. The terminal of claim 3, wherein the determined QoS level is set to 0.

5. A resource reservation method of a serving GPRS support node (SGSN), the method comprising:
   receiving, from a terminal having negotiated communication condition with a counterpart terminal, an activate packet data protocol (PDP) context request message for reserving first resources according to the communication condition; and
   transmitting, to the terminal, an activate PDP context reject message including information on a QoS level determined by the SGSN corresponding to the activate PDP context request message, when the first resources requested by the terminal cannot be allocated in a network,
   wherein it is determined by the terminal whether to request second resources based on the QoS level indicating resource amount that can be allocated to the terminal in the network, and
   wherein the second resources are requested when the terminal determines to request the second resources.

6. The method of claim 5, further comprising:
   transmitting, when the first resources requested by the terminal can be allocated entirely or partially, a create PDP context request message to a gateway GPRS support node (GGSN) after the receiving of the activate PDP context request message;
   receiving, from the GGSN, a create PDP context response message including the information on the determined QoS level indicating resource amount that can be allocated to the terminal; and
   determining whether resource allocation to the terminal is possible based on the determined QoS level included in the create PDP context response message.

7. The method of claim 6, further comprising transmitting, when the resource allocation is possible, an activate PDP context accept message to the terminal.

8. The method of claim 6, further comprising transmitting, when the resource allocation is impossible, the activate PDP context reject message including the information on the QoS level to the terminal.

9. A serving GPRS support node (SGSN) for reserving resources in a mobile multimedia system, the SGSN comprising:
   a transceiver configured to transmit and receive a signal; and
   a controller configured to control:
      receiving, from a terminal having negotiated communication condition with a counterpart terminal, an activate packet data protocol (PDP) context request message for reserving first resources according to the communication condition, and
      transmitting, to the terminal, an activate PDP context reject message including information on a QoS level determined by the SGSN corresponding to the activate PDP context request message, when the first resources requested by the terminal cannot be allocated in a network,
      wherein it is determined by the terminal whether to request second resources based on the QoS level indicating resource amount that can be allocated to the terminal in the network, and
      wherein the second resources are requested when the terminal determines to request the second resources.

10. The SGSN of claim 9, wherein the controller is further configured to:
    transmit, when the first resources requested by the terminal can be allocated entirely or partially, a create PDP context request message to a gateway GPRS support node (GGSN), and
    receive, from the GGSN, a create PDP context response message including the information on the determined QoS level indicating resource amount that can be allocated to the terminal.

11. The SGSN of claim 10, wherein the controller is further configured to determine whether resource allocation to the terminal is possible based on the determined QoS level included in the create PDP context response message.

12. The SGSN of claim 11, wherein the controller is further configured to transmit, when the resource allocation is possible, an activate PDP context accept message to the terminal.

13. The SGSN of claim 11, wherein the controller is further configured to transmit, when the resource allocation is impossible, the activate PDP context reject message including the information on the QoS level to the terminal.

* * * * *